US000001939H

(19) United States

(12) Statutory Invention Registration (10) Reg. No.: US H1939 H

Geller (43) Published: Feb. 6, 2001

(54) LARGE SPECTRAL BANDWIDTH, U.V. SOLAR BLIND DETECTOR

(75) Inventor: Myer Geller, San Diego, CA (US)

(73) Assignee: The United States of America as represented by the Secretary of the Navy, Washington, DC (US)

(21) Appl. No.: 06/925,853

(22) Filed: Sep. 2, 1986

(51) Int. Cl.[7] ..... G01J 1/42

(52) U.S. Cl. ..... 250/372; 250/339.05

(56) References Cited

U.S. PATENT DOCUMENTS

| | | | |
|---|---|---|---|
| 3,609,364 | 9/1971 | Paine | 250/83.3 |
| 3,838,282 | 9/1974 | Harris | 250/372 |
| 4,061,922 | 12/1977 | Last | 250/461 R |
| 4,065,672 | 12/1977 | Harpster | 250/372 |
| 4,241,258 | 12/1980 | Cholin . | |
| 4,350,890 | 9/1982 | Geelhood et al. | 250/372 |

*Primary Examiner*—Daniel T. Pihulic

(74) *Attorney, Agent, or Firm*—Ervin F. Johnston; Thomas Glenn Keough

(57) ABSTRACT

An early warning system for detecting the UV from a missile plume has a wide field of view, large spectral bandwidth, solar blind detector. A coated detector passes only a spectral region that embraces UV signals of interest and a wavelength shifter includes a material that shifts the impinging UV energy into a spectrum that embraces the frequencies emitted by fluorescent photons. A photomultiplier tube responsive to the fluorescent emissions provides a responsive read-out indicative of an incoming missile.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LARGE SPECTRAL BANDWIDTH, U.V. SOLAR BLIND DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Strike and interceptor aircraft operating in a hostile environment need a wide variety of increasingly sophisticated devices to assure their survival. Air or ground launched radar or infrared guided rocket propelled missiles can take a fearsome toll if their presence is not detected soon enough. When an early enough detection of these incoming missiles positively can be made, evasive action, flares, electronic counter measures, etc. can and greatly do reduce their effectiveness.

Early warning systems that detect UV from the missile plume require large area, wide field of view detectors. In addition to the need for being highly reliable and compact in size it is highly desirable that the detectors be sensitive in the region of the missile plumes+ UV radiation, from 230 to 280 nanometers, to reduce false alarms. Contemporary filters that use absorption type materials are expensive since they require large single crystals of nickel sulphate or the like. In addition, the solar-blind photomultiplier tubes that have been used with the large crystals also are expensive. As a consequence, technology and funding constraints may limit aircraft from having an appropriate detector in some high technology combat zones.

Thus, a continuing need exists in the state of the art for a large area, wide field of view detector of the UV radiation in a missile plume to assure the timely warning of an incoming missile.

SUMMARY OF THE INVENTION

The present invention is directed to providing a means for detecting the UV radiation of an incoming missile plume. A wide field of view detector has a coating that blocks some impinging radiation yet passes the UV radiation of interest that is radiated from an incoming missile plume. A material within the detector is stimulated by the incoming UV radiation to shift to fluorescent emissions which are outside the passband of the UV radiation. A second coating on an opposite wall of the detector passes the fluorescent emissions to a photomultiplier tube sensitive to the fluorescent emissions.

A prime object of the invention is to provide an improved detector of UV radiation emanating from a missile plume.

Another object is to provide a UV radiation detector having a pair of coatings on opposite side of a container filled with a material sensitive to impinging UV radiations to shift to responsive fluorescent emissions.

Still another object of the invention is to provide for an improved detector of the UV radiation emanating from a missile plume that relies upon less costly photomultiplier tubes sensitive to radiation in the fluorescent spectrum.

Yet a further object is to provide for an improvement in a UV detector that has a wide area, wide field of view detection capability.

Still yet another further object is to provide for an apparatus for UV detection that is compact and of reduced cost making it attractive for wide spread application.

These and other objects of the invention will become more readily apparent from the ensuing specification and appended claims when taken in conjunction with the drawings.

DESCRIPTION OF THE PREFERRED EMBODIMENT

Figure 1:
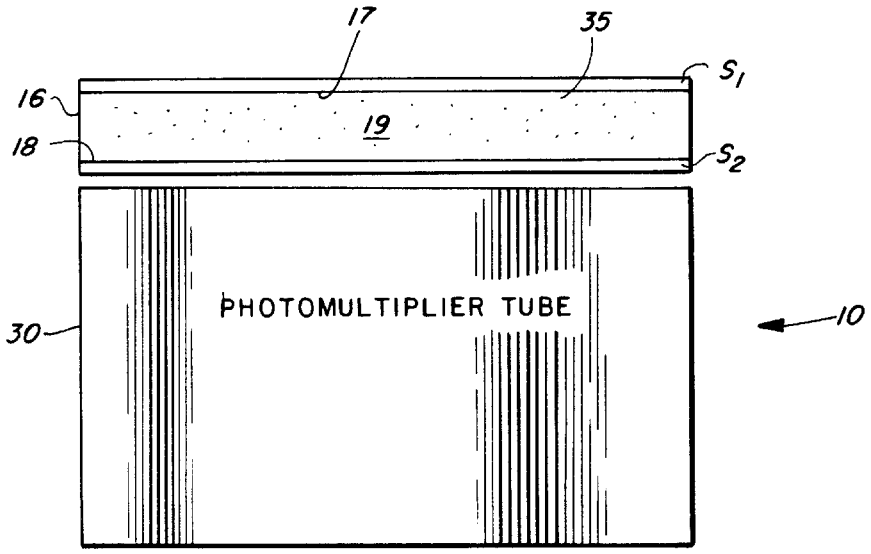
FIG. 1 is a schematic depiction of the principle constituents of the invention.
Figure 2:
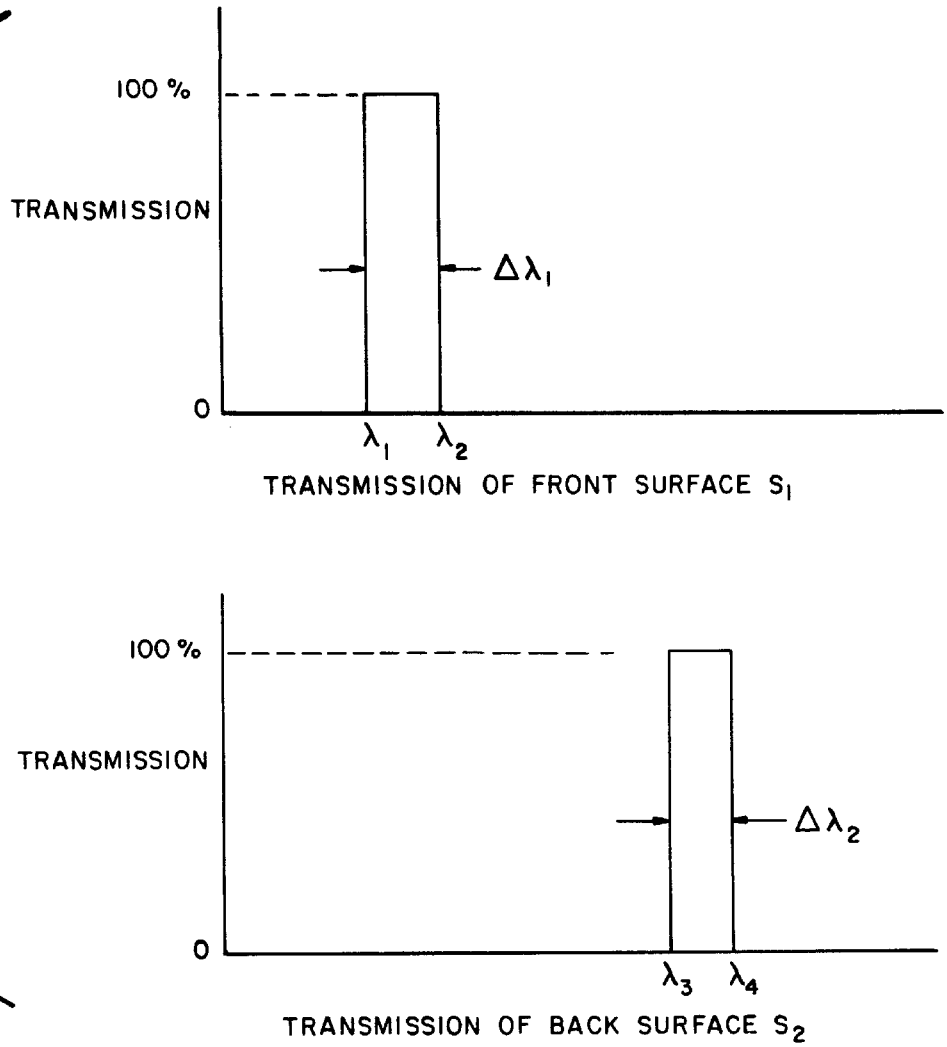
FIG. 2 depicts the passbands of the detector coatings $S_1$ and $S_2$.

Referring now to the drawings and in particular FIG. 1, a large area, wide field of view detector apparatus 10 has been designed to detect the UV radiation that is emitted from the missile plume of an incoming missile. A hollow container 15 is disposed adjacent to a photomultiplier tube 30. The pillbox-like container is fabricated from a section 16 of a quartz tube that has a pair of quartz plate caps 17 and 18 fused in place to form a cylinder closing a chamber 19. The container has a duct, not shown, to allow introduction of a gas as will be elaborated on below and suitable valves and piping must also be provided to allow the introduction of the gas into chamber 19. An upper surface of cap 17 is provided with a coating $S_1$ which passes only a spectral region $\Delta\lambda_1$ that lies between $\lambda_1$ and $\lambda_2$, see FIG. 2.

The transmission characteristic of the material $S_1$ is depicted as being square in shape. This is for purposes of demonstration only, it being realized that a certain amount of curvature is inherent. The coating can be a laminate of a first layer which has a low pass characteristic and a second layer which has a high pass characteristic. Both of these characteristics are known to be curved, however; for purposes of clarification, the passband is depicted as being square with lower and upper limits of 230 nm and 280 nm. In other words only solar blind energy can enter into container 15.

Coatings having a bandwidth capability as called for above are well within the purview of the current state of the art. Numerous laboratories provide such coatings by conventional vapor deposition techniques once the desired passbands are known. A typical laboratory having such a capability is the Optical Coating Laboratory Incorporated in Santa Rosa, Calif. This laboratory routinely provides such coatings upon request. Other laboratories are readily available nation wide to provide similar services.

An outer surface on cap 18 is provided with a coating $S_2$. This coating transmits only the wavelength region from $\lambda_3$ to $\lambda_4$, a spectral region $\Delta\lambda_2$. This region encompasses all emitted fluorescent photons but does not overlap the passband $\Delta\lambda_1$. Since transmission bands $\Delta\lambda_1$ and $\Delta\lambda_2$ do not overlap, container 15 is completely opaque to all wavelengths incident on it.

In this case, the bandwidth $\Delta\lambda_2$ may span a range of between 740 nm and 790 nm. The coating $S_2$ like coating S1 is fabricated by a suitably equipped lab in accordance with well established techniques to provide this passband.

Operation to provide a responsive signal at the output of photomultipler tube 30 requires that there be a wavelength shifting medium within chamber 19. In other words, photons of UV energy passing through coating S1 are shifted to longer wavelengths by the proper medium contained in chamber 19. This wavelength shifting or converting material may be a gas liquid or a solid and should have the following characteristics. First it absorbs all the photons that pass through surface S1. Second it fluoresces with large values of quantum efficiency with emission of a few wavelengths. Third the spectral region $\Delta\lambda_1$ should be removed from the spectral region $\Delta\lambda_2$ for ease of discrimination. For this reason coating S2 applied to the surface of cap 18 has a passband $\Delta\lambda_2$ that encompasses all the emitted fluorescent photons of the material contained within chamber 19. Photomultiplier tube 30 behind coating S2 is selected to be sensitive only to the spectral region $\Delta\lambda_2$.

Figure 3:
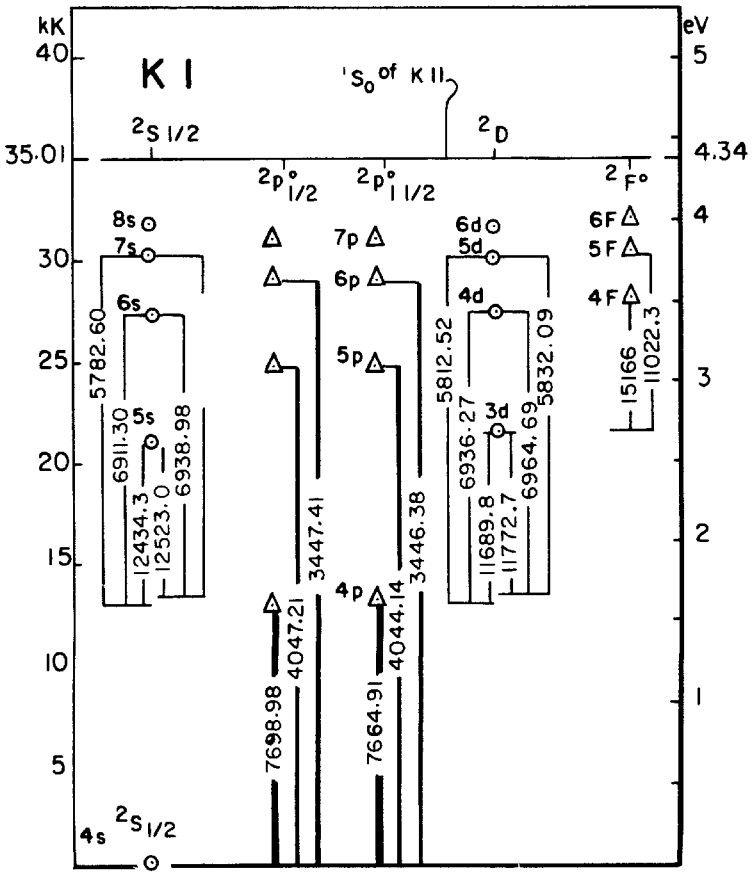
FIG. 3 shows an energy level diagram with electronic transmissions of potassium.

Potassium vapor 35 may be selected as the wavelength shifting medium and is diffused in chamber 19. The vapor can be diffused in chamber 19 by methods well known in the art and elaboration at this point would only belabor the obvious. All the photons in region $\Delta\lambda_1$ have energies between 4.42 and 5.39EV. As these values are larger than the 4.34EV ionization energy of potassium all the UV photons will be absorbed. The fluorescent emission from the potassium vapor consists mainly of the doublets 769.9 and 766.5 nanometer. Appropriately selecting the passband of surface S2 to embrace a passband $\Delta\lambda_2$ extending from 740 nm to 790 nm will transmit the fluorescent emission of the potassium vapor medium for the PMT. A typical photomultiplier tube that can be used is a Hamamatsu Red-Enhanced Multiply-Alkali photocathode type R712. FIG. 3, in its depiction of the energy level diagram of potassium, shows that the major permissible electronic transitions are indicated by vertical lines with the emission wavelengths printed in the center of the line. This type of electronic jump occurs over very narrow energy spread, as the energy levels of the ground state and the excited state are very narrow (assuming the pressure is not too high). Thus, the emission and absorption lines for these states have a very narrow spectral width.

On the other hand, the ionized state of the K atom, indicated by the horizontal line at 4.34 is a group of contiguous, continuum states. Thus, the spectral width of this transition will be very broad. One boundary of this width is the minimum energy to ionize the atom, 4.34 e.v., (285.6 nm photons). The other end of this width will extend into the continuum, say to 5 e.v. a photon energy of 248 nm.

The ionized atom decays to the ground state by photon emission at 769.9 or 764.5 nm. These two transitions are the strongest in the potassium spectrum.

In other words, the K vapor allows a relatively broadband absorption of UV energy over a broad spectral range (about 240 to 280 nm). From this high ionized state, the atoms decay with a subsequent emission at the 769.9 and 766.5 nm, as fluorescent emissions.

Inclusion of coating S1 by itself eliminates some spurious impinging energy photons to contribute to more efficient operation. The shifting of the UV radiation by the potassium vapor into the fluorescent spectrum and passing of this spectrum through layer S2 further blocks spurious signals from reaching photomultiplier tube 30 to further avoid creation of erroneous signals. Only the fluorescent radiation which is shifted from the UV spectrum has any effect on the output signal of the photomultiplier tube. Cost effectiveness is assured by substitution of the fluorescent sensitive photomultiplier tube as opposed to a UV spectrum photomultiplier tube. This is because fluorescent sensitive photomultiplier tubes are less complicated to build and, as a consequence, their per unit costs are reduced.

Obviously, many modifications and variations of the present invention are possible in the light of the above teachings. It is therefore to be understood that within the scope of the appended claims the invention may be practiced otherwise than as specifically described.

What is claimed is:

1. An apparatus for detecting the UV radiation in missile plume comprising:

a photomultiplier tube responsive to fluorescent emissions to provide a representative output signal;

a detector having a first surface covered with a first coating having properties to pass the UV radiation and a second coating disposed adjacent the photomultiplier tube having properties to pass the fluorescent emissions, the passbands of the coatings being separate and distinct one from the other, the detector further having a material therein having the properties for shifting the wavelength of the UV radiation to that of the fluorescent emissions.

2. An apparatus according to claim 1 in which the material of the detector is potassium vapor responsive to absorb UV radiation and to transition to a longer wavelength and the first surface presents a wide area, wide field of view UV responsive surface.

3. A method of detecting the UV missile plume within the solar blind UV spectrum comprising:

blocking out signals other than a passband including the UV missile plume signals with a first coating;

shifting the frequency of the plume signals to a fluorescent bandwidth outside of the solar blind UV spectrum;

blocking out signals other than the fluorescent bandwidth outside of the solar blind UV spectrum with a second coating; and amplifying the fluorescent bandwidth.

4. A method according to claim 3 in which the step of shifting includes the transition of UV wavelengths to longer wavelengths fluorescent emission.

5. A method according to claim 4 in which the step of transition includes providing a potassium vapor to receive the information signal passband to assure the transition to the longer wavelengths of fluorescent emission.

* * * * *